(12) United States Patent
Berg et al.

(10) Patent No.: US 6,876,860 B1
(45) Date of Patent: Apr. 5, 2005

(54) METHOD FOR IMPLEMENTING A CALL-BACK SERVICE IN A MOBILE RADIO NETWORK

(75) Inventors: Andreas Berg, Berlin (DE); Klaus Moneke, Berlin (DE); Bart Van Ballaer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 405 days.

(21) Appl. No.: 09/831,440

(22) PCT Filed: Sep. 6, 2000

(86) PCT No.: PCT/DE00/03079

§ 371 (c)(1),
(2), (4) Date: May 9, 2001

(87) PCT Pub. No.: WO01/19109

PCT Pub. Date: Mar. 15, 2001

(30) Foreign Application Priority Data

Sep. 9, 1999 (DE) .......................... 199 43 173

(51) Int. Cl.⁷ ................................ H04Q 7/20
(52) U.S. Cl. .................... 455/459; 455/433; 455/432.1; 455/445
(58) Field of Search ................. 455/459, 433, 455/432.1, 445, 406, 428, 417

(56) References Cited

U.S. PATENT DOCUMENTS

| | | | | |
|---|---|---|---|---|
| 5,375,162 A | * | 12/1994 | Kim et al. ................. 340/7.29 |
| 5,414,750 A | * | 5/1995 | Bhagat et al. .............. 455/416 |
| 5,546,442 A | * | 8/1996 | Foladare et al. ............ 455/417 |
| 5,548,636 A | * | 8/1996 | Bannister et al. ....... 379/390.01 |
| 5,559,859 A | * | 9/1996 | Dai et al. .................... 455/459 |
| 5,712,900 A | * | 1/1998 | Maupin et al. ............. 455/433 |
| 5,835,856 A | * | 11/1998 | Patel ........................... 455/406 |
| 5,839,072 A | * | 11/1998 | Chien .......................... 455/445 |
| 5,878,115 A | * | 3/1999 | Valentine et al. ........... 455/421 |
| 5,915,224 A | * | 6/1999 | Jonsson ..................... 455/552.1 |
| 5,915,225 A | * | 6/1999 | Mills .......................... 455/558 |
| 5,920,820 A | * | 7/1999 | Qureshi et al. ............. 455/461 |
| 5,924,035 A | * | 7/1999 | Joensuu ...................... 455/445 |
| 5,963,864 A | * | 10/1999 | O'Neil et al. ............... 455/445 |
| 5,966,660 A | * | 10/1999 | Jonsson ...................... 455/445 |
| 5,995,848 A | * | 11/1999 | Nguyen ...................... 455/528 |
| 6,006,094 A | * | 12/1999 | Lee ............................. 455/445 |
| 6,134,433 A | * | 10/2000 | Joong et al. ................ 455/417 |
| 6,154,644 A | * | 11/2000 | Murray ..................... 455/414.1 |
| 6,192,237 B1 | * | 2/2001 | Clapton et al. .......... 455/422.1 |
| 6,249,674 B1 | * | 6/2001 | Verdonk ................... 455/404.1 |
| 6,259,914 B1 | * | 7/2001 | Koster ..................... 455/432.1 |
| 6,363,144 B1 | * | 3/2002 | Becher et al. ......... 379/211.01 |
| 6,374,107 B1 | * | 4/2002 | Boylan et al. ........... 455/432.3 |
| 6,389,283 B1 | * | 5/2002 | Sanchez Herrero ......... 455/433 |
| 6,496,689 B1 | * | 12/2002 | Keller et al. ................ 455/406 |
| 2003/0207689 A1 | * | 11/2003 | Roberts et al. ............. 455/445 |

FOREIGN PATENT DOCUMENTS

| WO | WO 99/05876 | 2/1999 |
|---|---|---|
| WO | WO 99/17567 | 4/1999 |

* cited by examiner

Primary Examiner—William Trost
Assistant Examiner—Sharad Rampuria
(74) Attorney, Agent, or Firm—Bell Boyd & Lloyd LLC

(57) ABSTRACT

A USSD Call Back Service UCB which provides a function via which a telephone call MOC begun in a foreign country is implemented by a call back service which then provides the functions of:

Analysis of an incoming USSD string,

Analysis of A party and B party,

Call set-up to the A party,

Call set-up to the B party.

11 Claims, 2 Drawing Sheets

METHOD FOR IMPLEMENTING A CALL-BACK SERVICE IN A MOBILE RADIO NETWORK

BACKGROUND OF THE INVENTION

1. Field of the Invention

Systems for mobile communication have increasingly gained in importance in recent years. Their spread is aided by the introduction of standards such as GSM (Global System for Mobile Communication) and, in the meantime; it has also become possible to communicate outside the borders of one's own country and network operator.

If a telephone call originates in a foreign country, the network operator of the visited public land mobile network (VPLMN) currently usually earns 70% of the fees paid by the network subscriber whereas the operator of the home public land mobile network (HPLMN) only receives 30%.

2. Description of the Prior Art

The customer of telecommunication networks, mobile radio networks, is already being offered a multiplicity of telecommunication services. To be able to offer new services rapidly and independently of manufacture and network operator, if possible, including the existing infrastructure, the concept of the Intelligent Network has been developed. A standardized concept which defines the IN architecture has been worked out in the ITU (see Standards Q.1200 ff).

In a further development, CAMEL (Customized Application for Mobile Network Enhanced Logic, see also GSM 02.78) was developed in which IN features were introduced into the GSM architecture. CAMEL simplifies roaming both internationally and between networks of different operators and creates a uniform protocol for accessing CAMEL servers in other GSM networks.

It is an object of the present invention, therefore, to specify a solution to the abovementioned problem in international or inter-provider roaming.

It is another object of the present invention to implement a call back service in a mobile radio network.

SUMMARY OF THE INVENTION

Accordingly, the call back service for roaming mobile radio subscribers of the present invention allows PLMN operators to use the advantages of a call back service.

The call back service UCB (USSD (unstructured supplementary service data) Call Back Service) provides the desired functions:

Analysis of an incoming USSD string,
Analysis of A party and B party,
Call set-up to the A party,
Call set-up to the B party.

The IN service UCB is triggered via a USSD string from the visited network VPLMN. If the roaming subscriber is not an IN (intelligent network) customer, the HLR (home location register) forwards the USSD string to a standard SCP which supports UCB. If he is an IN customer, the correct service control point SCP address is located in the CAMEL Subscriber Information CSI.

Using a call back service, the ratio of fees can be reversed in favor of the HPLMN operator of the home network. Since the call is set up by the HPLMN, the HPLMN operator now receives the greater proportion of the fees.

The interworking of the novel USSD Call back Service UCB with other IN services also will be described. The special feature is that UCB enables roaming subscribers to telephone via IN even if the visited network (VPLMN does not support the CAMEL protocol.

The UCB service is, thus, available to roaming IN customers who can use their subscribed service even without CAMEL. That is, roaming subscribers use CAMEL in VPLMNs which support CAMEL, and in countries without CAMEL support the USSD solution is used.

Furthermore, non-IN customers also can use UCB.

Another problem is interworking between a number of IN services in an SCP. This problem is solved by the IN service UCB cleverly setting the Called Party Address (CdPA) and Calling Party Address (CgPA).

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
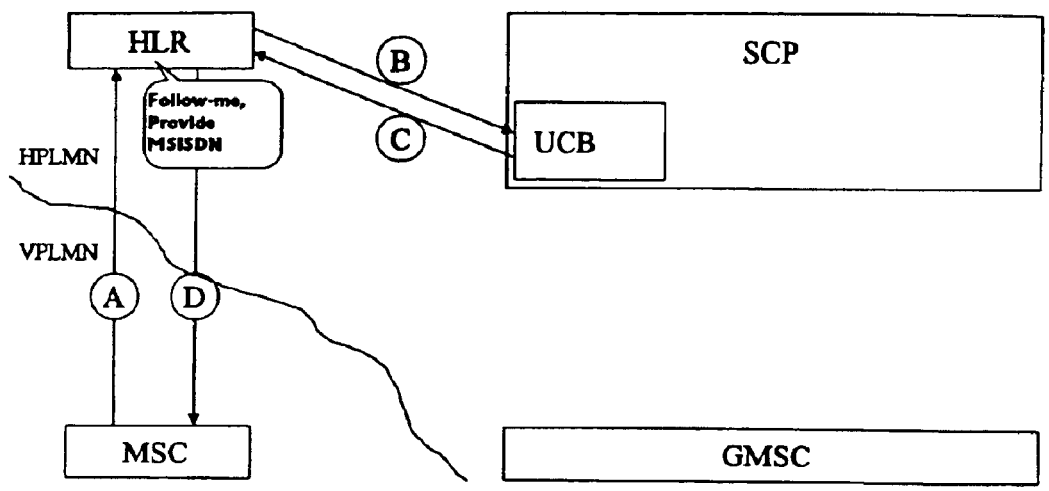
FIG. 1 shows the activation of the UCB service in the SCP.

FIG. 1 shows how the call back service UCB is triggered by an incoming USSD (Unstructured Supplementary Service Data) string which is transmitted by the roaming mobile radio subscriber via the mobile switching center MSC in the visited network VPLMN, A.

A USSD string is normally intended for the home location register HLR in which the subscriber is administered. Here, however, the "follow-me" (SR7) function available in Siemens HLRs is triggered via the USSD string header. On the one hand, it expands the USSD string by the MSISDN (Mobile Subscriber ISDN Number) of the subscriber (A party) and then forwards it to a service control point SCP which supports the call back service UCB (B).

The SCP starts the IN service UCB. This service, in turn, returns to the A party a USSD string which acknowledges the receipt, C, D.

Figure 2:
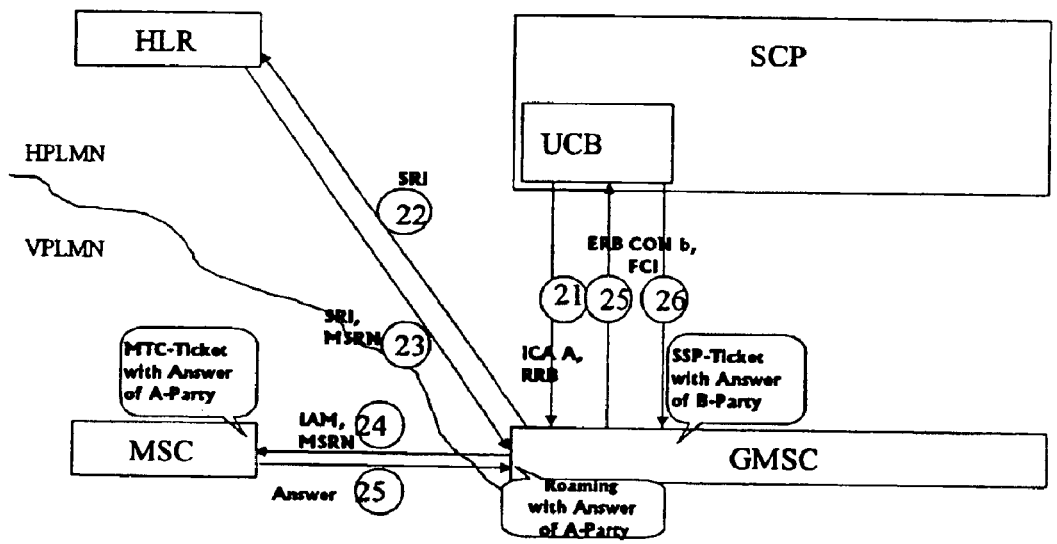
FIG. 2 shows how the call back connection according to the present invention is set up.

The IN service UCB first sets up a connection to the A party via "Initiate Call Attempt" ICA, see FIG. 2. Calling party CgPA is now the Called Party CdPA (B party) actually dialed and CdPA is the original CgPA (MSISDN of the A party). At the same time, all Event Detection Points EDP are armed with RequestReportBCSMEvent RRB, 21, and then the procedure continues with "Continue" CUE.

According to the GSM standard, a gateway mobile switching center GMSC interrogates the home location register HLR of the subscriber with SendRoutingInformation SRI, 22, 23. The connection to the roaming party is set up via an IAM, 24. The service UBC receives via EventReportBCSM ERB the information whether the A party has answered (answer), is busy, is not answering (no_answer) or not available (not_reachable), 25.

In the case of the "answer", UCB responds with FurnishChargingInformation FCI so that an IN charges (AMA) ticket is written in the GMSC, and the operation "connect" CON which establishes the connection with the B party originally requested, 26.

In all other events (busy, no_answer, not_reachable), the IN dialog is ended in an ordered manner with "ReleaseCall"

RL. Apart from "answer", it is not absolutely necessary to set the flags of the EDPs. If, for example, the "not_reachable" flag is not set, the SCP does not find out about this event. The GMSC releases the call by itself and the SCP responds in the same way if it does not receive any information within a certain time.

Charging is ensured by the scenario. Using "answer" by A, the GMSC generates a "roaming ticket" in which the answer time is entered. In the VMSC of the A party, an "MTC (mobile terminated cell) Ticket" is written and the SSP writes an "IN AMA (automatic message accounting) Ticket" due to the FCI (furnish charging information) operation.

Using "GetUserRecord", UCB decides whether and which IN service has been subscribed to by the A party. If the A party has no IN subscription, UCB acts as described above.

Figure 3:
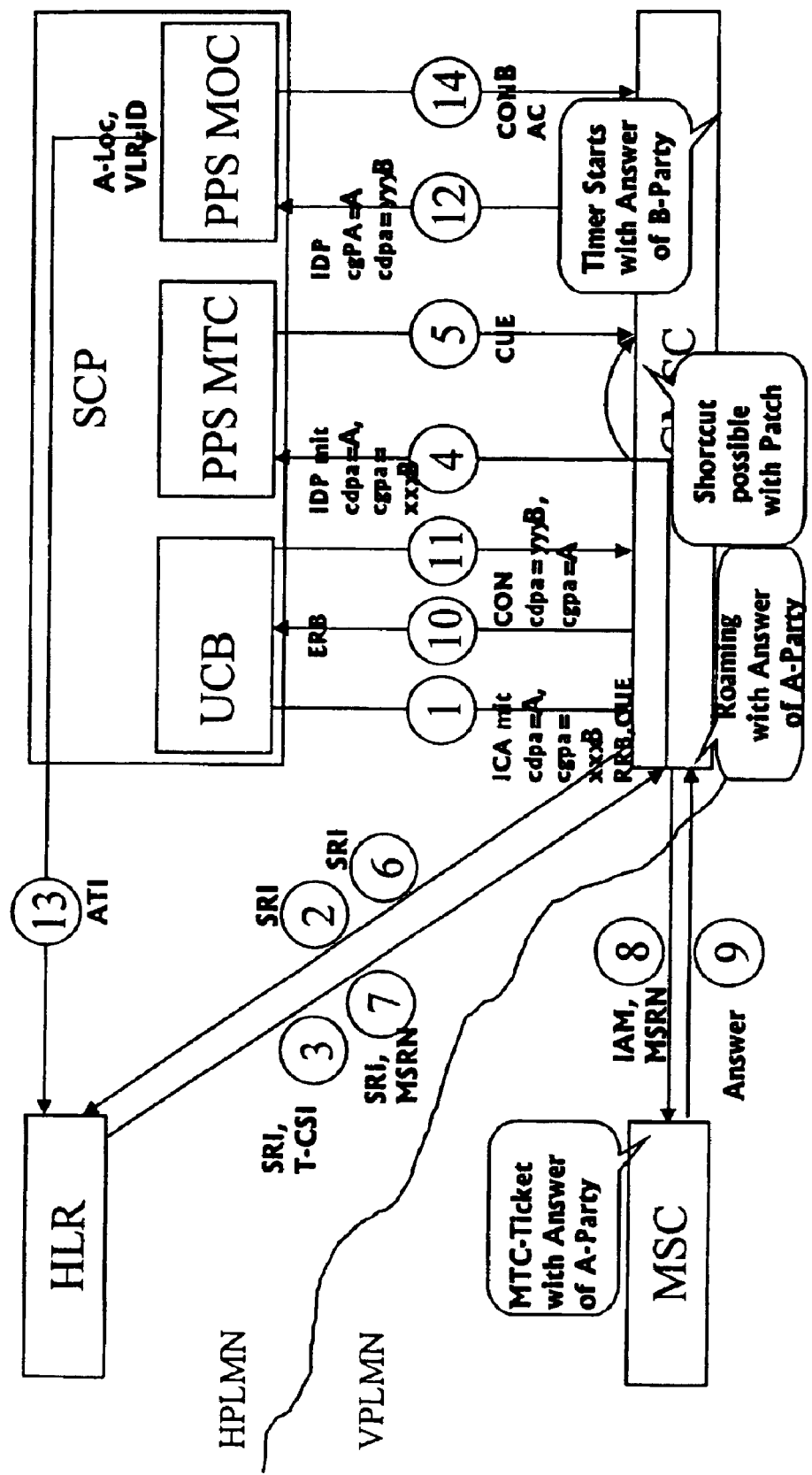
FIG. 3 shows the interworking with a telecommunication network which does not support CAMEL.

If the A party has an IN subscription, UCB expands the CgPA in the InitiateCallAttempt ICA by an administerable number of administerable numbers XXX which also can contain hexadecimal digits (in FIG. 3, the subscribed IN service prepaid service is shown by way of example), 1. The subsequent interrogation of the HLR, 2 and 3, possibly supplies a T-CSI.

Since the MTC IN dialog is not wanted—the roaming A party actually wants to transmit a mobile originated call (MOC)—it must either be suppressed via SDDPFC or in the EntryFSL (flexible service logic) or MTC (Mobile Terminated Call) service logic on the basis of the XXX code in the CgPA, 4 and 5. The second interrogation of the home location register HLR (second step in the two-stage interrogation!) supplies the MSRN (mobile station roaming number), 6 and 7, which provides for the connection to the A party, 8.

As soon as the A party answers, 9, the UCB is informed of this via ERB, 10. UCB then continues with the "Connect" operation CON which, as calling party CgPA, contains the MSISDN of the A party and, as called party CdPA, the number of the B party originally dialed, expanded by an administerable number of administerable numbers YYY (hexadecimal digits are possible), 11. Following YYY, a code point is to be set up at SSP which triggers the desired IN service at the "correct" SCP via an IDP (Initial Detection Point) (YYY must therefore be set up IN.service-specifically).

Since the SCP has no information whatever about the A location of the A party, the service logic EntryFSL or the MOC IN service logic must determine the A location via the "AnyTimeInterrogation" ATI, 13. After that, the MOC service logic runs as if it had been started directly via a CAP (camel application part):IDP. In the case shown, PPS (prepaid service) continues with "ApplyCharging" AC and "Connect" CON B party.

If the A party is not available (busy, no_answer, not_reachable), the procedure described above optionally can be adopted.

Although the present invention has been described with reference to specific embodiments, those of skill in the art will recognize that changes may be made thereto without departing from the spirit and scope of the invention as set forth in the hereafter appended claims.

List of abbreviations
AMA Automatic Message Accounting
CAMEL Customized Applications For Mobile Network Enhanced Logic (GSM 02.78)
CAP CAMEL Application Part
CdPA Called Party
CgPA Calling Party
CON Connect
CSI CAMEL Subscriber Information
CUE Continue
EDP Event Detection Point
FCI Furnish Charging Information
FSL Flexible Service Logic
GMSC Gateway Mobile Services Switching Center
GSM Global System for Mobile Communication
HLR Home Location Register
HPLMN Home Public Land Mobile Network
ICA InitiateCallAttempt
IN Intelligent Network
MOC Mobile Originated Call
MSC Mobile Switching Center
MSISDN Mobile Subscriber ISDN Number
MSRN Mobile Station Roaming Number
MTC Mobile Terminated Call
PPS Prepaid Service
SCP Service Control Point
SRI Send Routing Information
VPLMN Visited Public Land Mobile Network
UCB USSD Call Back Service
USSD Unstructured Supplementary Service Data

We claim:

1. A method for implementing a call back service in a mobile radio network, the method comprising:

transmitting a service call from a calling party via a first mobile switching center in a first subnetwork to a home location register in a second subnetwork;

expanding an Unstructured Supplementary Service Data (USSD) string, which is part of the service call, in the home location register and forwarding the service call with the expanded USSD string to a service control point;

analyzing the service call at the service control point, including information relating to the calling party and a called party;

initiating a first call set-up to the calling party; and initiating a second call set-up to the called party.

2. A method for implementing a call back service in a mobile radio network as claimed in claim 1, wherein both the first and second call set-up are initiated by a second mobile switching center in the second subnetwork.

3. A method for implementing a call back service in a mobile radio network as claimed in claim 2, the method further comprising:

sending, via the service control point, a connection set-up request to the second mobile switching center.

4. A method for implementing a call back service in a mobile radio network as claimed in claim 1, the method further comprising:

starting a function in the home location register by a header in the service call.

5. A method for implementing a call back service in a mobile radio network as claimed in claim 4, wherein the service call is supplemented by a call number of the calling party by the home location register before being forwarded to the service control point.

6. A method for implementing a call back service in a mobile radio network as claimed in claim 1, the method further comprising:

acknowledging receipt of the service call to the calling party by the service control point.

7. A method for implementing a call back service in a mobile radio network as claimed in claim 1, the method further comprising:

generating charging information via the second mobile switching center upon successful call set-up.

8. A method for implementing a call back service in a mobile radio network as claimed in claim 1, the method further comprising:

ending the service call, which is an intelligent service call, in an ordered manner by the respective service upon an unsuccessful call set-up.

9. A method for implementing a call back service in a mobile radio network as claimed in claim 1, the method further comprising:

subscribing, by the subscriber, to a further intelligent network service;

sending, via the service control point, a connection set-up request to the second mobile switching center; and supplementing the connection set-up request by an identity of the further intelligent network service.

10. A method for implementing a call back service in a mobile radio network as claimed in claim 1, the method further comprising:

suppressing, at the service control point, intelligent network dialogues produced with respect to the call originally received as a mobile terminated call.

11. A method for implementing a call back service in a mobile radio network as claimed in claim 9, the method further comprising:

requesting a connection set-up to the called party after successful connection set-up to the calling party; and supplementing a number originally dialed by an identity of the service control point responsible for the further intelligent network service.

* * * * *